United States Patent
Ioffe et al.

(10) Patent No.: US 9,063,954 B2
(45) Date of Patent: Jun. 23, 2015

(54) NEAR DUPLICATE IMAGES

(71) Applicant: Google Inc., Mountain View, CA (US)

(72) Inventors: Sergey Ioffe, Mountain View, CA (US); Mohamed Aly, Santa Barbara, CA (US); Charles J. Rosenberg, Cupertino, CA (US)

(73) Assignee: Google Inc., Mountain View, CA (US)

( * ) Notice: Subject to any disclaimer, the term of this patent is extended or adjusted under 35 U.S.C. 154(b) by 166 days.

(21) Appl. No.: 13/832,122

(22) Filed: Mar. 15, 2013

(65) Prior Publication Data

US 2014/0105505 A1 Apr. 17, 2014

Related U.S. Application Data

(60) Provisional application No. 61/714,015, filed on Oct. 15, 2012.

(51) Int. Cl.
  *G06F 17/30* (2006.01)
  *G06K 9/46* (2006.01)
  *G06K 9/62* (2006.01)

(52) U.S. Cl.
  CPC ........ *G06F 17/30247* (2013.01); *G06K 9/4676* (2013.01); *G06K 9/6202* (2013.01)

(58) Field of Classification Search
  None
  See application file for complete search history.

(56) References Cited

U.S. PATENT DOCUMENTS

| | | | |
|---|---|---|---|
| 8,254,697 B2 | 8/2012 | Isard et al. | |
| 8,295,651 B2 | 10/2012 | Hu et al. | |
| 8,447,107 B1 * | 5/2013 | Dhua et al. | 382/170 |
| 2007/0239756 A1 * | 10/2007 | Li et al. | 707/102 |
| 2009/0060351 A1 * | 3/2009 | Li et al. | 382/224 |
| 2010/0088295 A1 * | 4/2010 | Duan et al. | 707/705 |
| 2010/0195914 A1 | 8/2010 | Isard et al. | |
| 2011/0106798 A1 | 5/2011 | Li et al. | |
| 2012/0076423 A1 | 3/2012 | Tang et al. | |
| 2012/0269439 A1 * | 10/2012 | Yang et al. | 382/190 |
| 2012/0294514 A1 * | 11/2012 | Saunders et al. | 382/159 |

(Continued)

FOREIGN PATENT DOCUMENTS

| | | |
|---|---|---|
| EP | 1221662 | 7/2002 |
| EP | 1185951 | 12/2007 |

(Continued)

OTHER PUBLICATIONS

Wu et al., "Practical Elimination of Near-Duplicates from Web Video Search," Proceedings of the 15th International Conference on Multimedia, Jan. 1, 2007, 218-227.

International Search Report and Written Opinion in International Application No. PCT/US2013/064592, mailed Jan. 13, 2014, 14 pages.

*Primary Examiner* — Bhavesh Mehta
*Assistant Examiner* — David F Dunphy
(74) *Attorney, Agent, or Firm* — Fish & Richardson P.C.

(57) ABSTRACT

Methods, systems, and apparatus, including computer programs encoded on computer storage media, for determining image search results. One of the methods includes generating a plurality of feature vectors for each image in a collection of images, wherein each feature vector is associated with an image tile of an image, wherein each feature vector corresponds to one of a plurality of predetermined visual words. All images in the collection of images that share at least a threshold number of matching visual words associated with matching image tiles are classified as near-duplicate images.

18 Claims, 4 Drawing Sheets

(56) References Cited

U.S. PATENT DOCUMENTS

2012/0314961 A1  12/2012  Isard et al.
2013/0013578 A1* 1/2013  Yang et al. .................. 707/706

FOREIGN PATENT DOCUMENTS

| EP | 2443589 | 1/2013 |
| WO | WO2011/161084 | 12/2011 |

* cited by examiner

NEAR DUPLICATE IMAGES

CROSS-REFERENCE TO RELATED APPLICATIONS

This application claims the benefit under 35 U.S.C. §119 (e) of the filing date of U.S. Provisional Patent Application No. 61/714,015, filed on Oct. 15, 2012, entitled "Near-Duplicate Images," the entirety of which is herein incorporated by reference.

BACKGROUND

This specification relates to information retrieval.

Conventional information retrieval systems are used to identify a wide variety of resources, for example, images, audio files, web pages, or documents, e.g., news articles. Additionally, search results presented to a user that identify particular resources responsive to a query are typically ranked according to particular criteria.

SUMMARY

Image search systems can receive an image query and provide a set of image search results in response to the image query. The image search results identify images and can be ordered by relevance to text of the image query or by a measure of similarity of the identified images to an image specified by the image query.

Image search results may include near-duplicate images. For example, one or more of the image search results can be near-duplicate images of the query image or of other images in the image search results.

An image search system can identify near-duplicate images in a collection of images, e.g., a collection of image search results or a collection of images in an index or database of images, by comparing feature descriptors and color descriptors computed from the images. The system can compute visual words from a vocabulary of visual words using features of the content of an image. The system can generate feature descriptors by encoding visual words and the associated image tiles from which the visual words were derived. Color descriptors can be generated by computing representative color values from color channels of an image.

In general, one innovative aspect of the subject matter described in this specification can be embodied in methods that include the actions of generating a plurality of feature vectors for each image in a collection of images, wherein each feature vector is associated with an image tile of an image, wherein each feature vector corresponds to one of a plurality of predetermined visual words; and classifying as near duplicate images all images in the collection of images that share at least a threshold number of matching visual words associated with matching image tiles. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Generating a feature vector for an image in the collection of images comprises determining a feature region in the image; computing a feature vector from the feature region in the image; and quantizing the feature vector to one of the plurality of visual words. The actions include determining a different image tiling for each visual word in the plurality of predetermined visual words, wherein an image tiling partitions an image into a plurality of distinct tiles. Determining a different image tiling for each visual word in the plurality of predetermined visual words comprises computing an offset based on an index number of the visual word. The actions include determining an image tile to which the feature region is located; and associating the visual word with the image tile for the feature region. The actions include generating a feature descriptor for each image including encoding each element of the feature descriptor using each visual word and associated image tile of the image. The actions include determining an image type for each image in the collection of images; and determining the threshold number of matching visual words between images based on the image type of the images. The actions include receiving an image query; obtaining the collection of images as image search results for the image query; and removing one or more near duplicate images from the collection of images as image search results for the image query.

In general, another innovative aspect of the subject matter described in this specification can be embodied in methods that include the actions of receiving a query image; obtaining a set of image search results for the query image; generating a plurality of feature vectors for the query image, wherein each feature vector is associated with an image tile of the query image, wherein each feature vector corresponds to one of a plurality of predetermined visual words; generating a plurality of feature vectors for each image identified by the image search results, wherein each feature vector is associated with an image tile of an image; determining that one or more images in the image search results that share at least a threshold number of matching visual words associated with matching image tiles with the query image are near duplicate images of the query image; and removing one or more near duplicate images of the query image from the set of image search results. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Generating a feature vector for an image in the collection of images comprises determining a feature region in the query image; computing a feature vector from the feature region in the image; and quantizing the feature vector to one of the plurality of visual words. The actions include determining a different image tiling for each visual word in the plurality of predetermined visual words, wherein an image tiling partitions an image into a plurality of distinct tiles. Determining a different image tiling for each visual word in the plurality of predetermined visual words comprises computing an offset based on an index number of the visual word. The actions include determining an image tile to which the feature region is located; and associating the visual word with the image tile for the feature region. The actions include generating a feature descriptor for each image including encoding each element of the feature descriptor using each visual word and associated image tile of the image. The actions include determining an image type for each image in the collection of images; and determining the threshold number of matching visual words between images based on the image type of the images.

In general, another innovative aspect of the subject matter described in this specification can be embodied in methods that include the actions of generating a plurality of feature vectors for each image in a collection of images, wherein each feature vector is associated with an image tile of an image, wherein each feature vector corresponds to one of a plurality of predetermined visual words; generating a color descriptor that encodes color information of each image; and classifying as near duplicate images all images in the collection of images that share at least a threshold number of matching visual words and that have color descriptors that are within a threshold color distance. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include computing a representative color value for each of one or more color channels of each image in the collection of images, wherein generating the color descriptor comprises encoding the one or more representative color values for the one or more color channels of the image; and computing a color distance between two images as a sum of absolute values of differences between corresponding representative color values for each of the one or more color channels of the two images. The threshold color distance between two images depends on a number of matching visual words between the images.

Particular embodiments of the subject matter described in this specification can be implemented so as to realize one or more of the following advantages. Encoded visual words and corresponding image tiles can be used to generate feature descriptors that represent the local features in an image as well as their geometric arrangement, yet which require a relatively small amount of storage space. The small descriptors can be attached to every image in a search result list without incurring significant computation or storage costs. Using small descriptors can allow rapid comparison between images. Rapid comparison between images allows near-duplicate determinations to be performed online without significantly affecting query response times. Online determination of near-duplicate images can allow the system to immediately perform near-duplicate determinations for new images added to the index without recomputing near-duplicates for an entire collection. Online determination of near-duplicate images also allows near-duplicate determinations between different collections of images without requiring costly cross-collection determinations of near-duplicates. Color descriptors computed from images' representative color information can also be used to perform a first pass that further speeds up near-duplicate determinations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
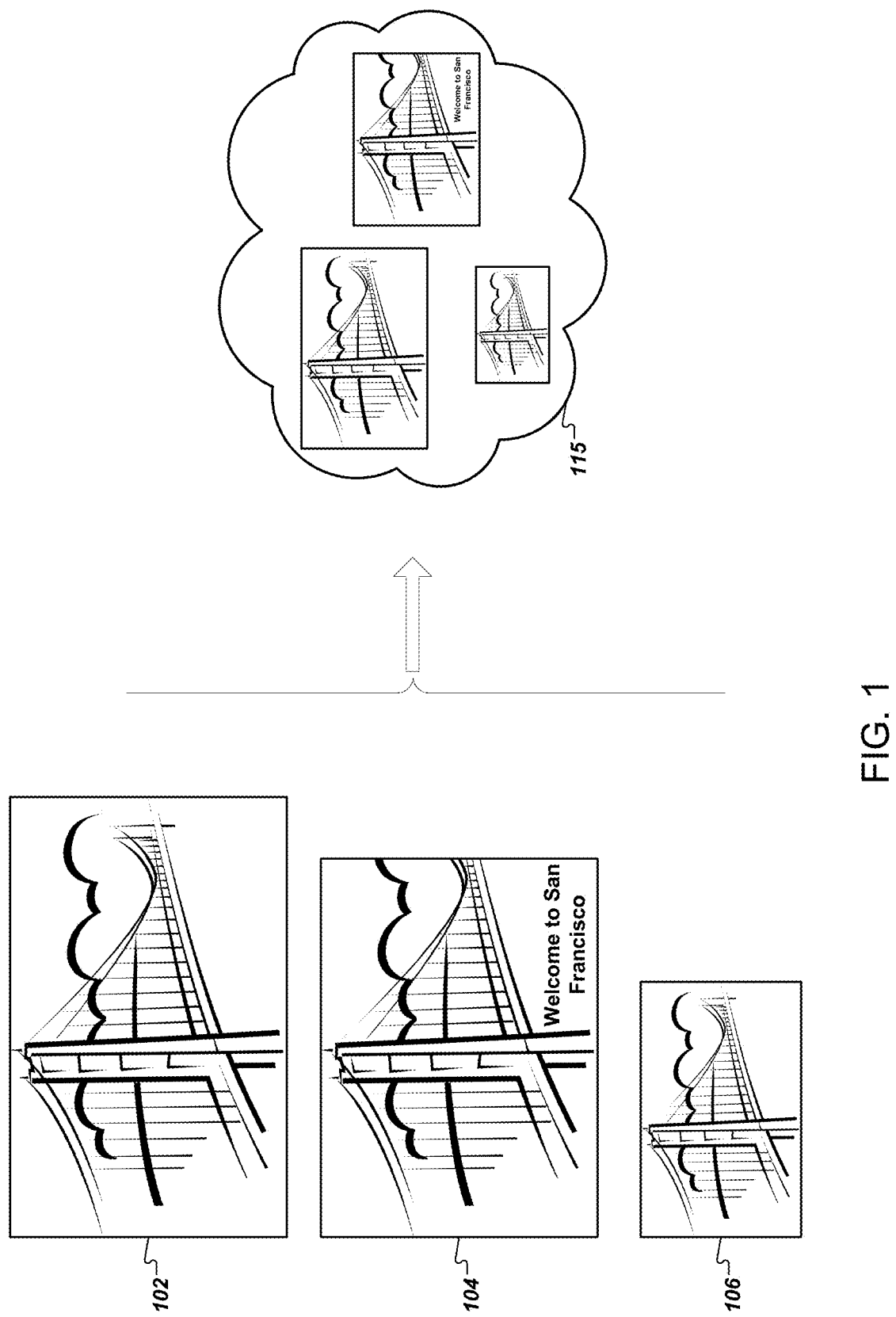
FIG. 1 is a diagram of near duplicate images.

FIG. 1 is a diagram of near-duplicate images. In general, an image search system can improve the quality of image search result retrieval by determining that some images are near-duplicates of each other or of a particular image. In FIG. 1, the images 102, 104, and 106 represent near-duplicate images.

An image search system can determine that some images are near-duplicates of each other. Some images in a collection of images are different versions of the same original image. In other words, the images are different versions of the same original pixels. An image can be a resized or a rescaled version of another image. For example, image 106 is a smaller version of image 102. An image can also be a compressed version of another image, e.g., a compressed JPEG image computed from an uncompressed bitmap image. An image may be a cropped version of another image. For example, image 104 is a cropped version of image 102. An image may also have minor text or other minor alterations added, yet an image search system can still classify such images as near-duplicate images. For example, image 104 has minor text that has been added to a cropped version of image 102. An image search system can classify these images to be near-duplicate images. An image search system can also consider duplicate images to be near-duplicate images.

In addition, some images in a collection of images can be images of the same object or scene, e.g., different images of the Golden Gate Bridge or the Eiffel Tower. While such images may be captured at different times, under different conditions, and by different cameras, an image search system may also classify such images as near duplicates.

An image search system can treat images as near-duplicate images by building a collection 115 of near-duplicate images. A near-duplicate relationship between two images may be, but need not be, commutative. In other words, all images in collection 115 may be near-duplicates of each other image in collection 115. The images in collection 115 may also be near-duplicates of a separate image, e.g. a query image. The near-duplicate relationship need not be transitive. In other words, if images A and B are near-duplicates, and images B and C are near-duplicates, A and C may be, but need not be, near-duplicates as well.

An image search system can use a determination that images are near-duplicates for a variety of purposes. For example, an image search system can improve image search results by suppressing image search results that are near-duplicate images of images that have been selected for presentation. In other words, an image search system can remove near-duplicate images from a search result set instead of providing multiple near-duplicate versions of the same image in the image search result set.

An image search system can also use near-duplicate determinations in order to determine an age of an image. For example, the system can assume that an image without an associated age is the same age as another, near-duplicate image. Additionally, if two near-duplicate images have different associated ages, the system can assume that both images have the age of the older image. The system can also use near-duplicate determinations to provide an image from a preferred source, e.g., a website.

Figure 2:
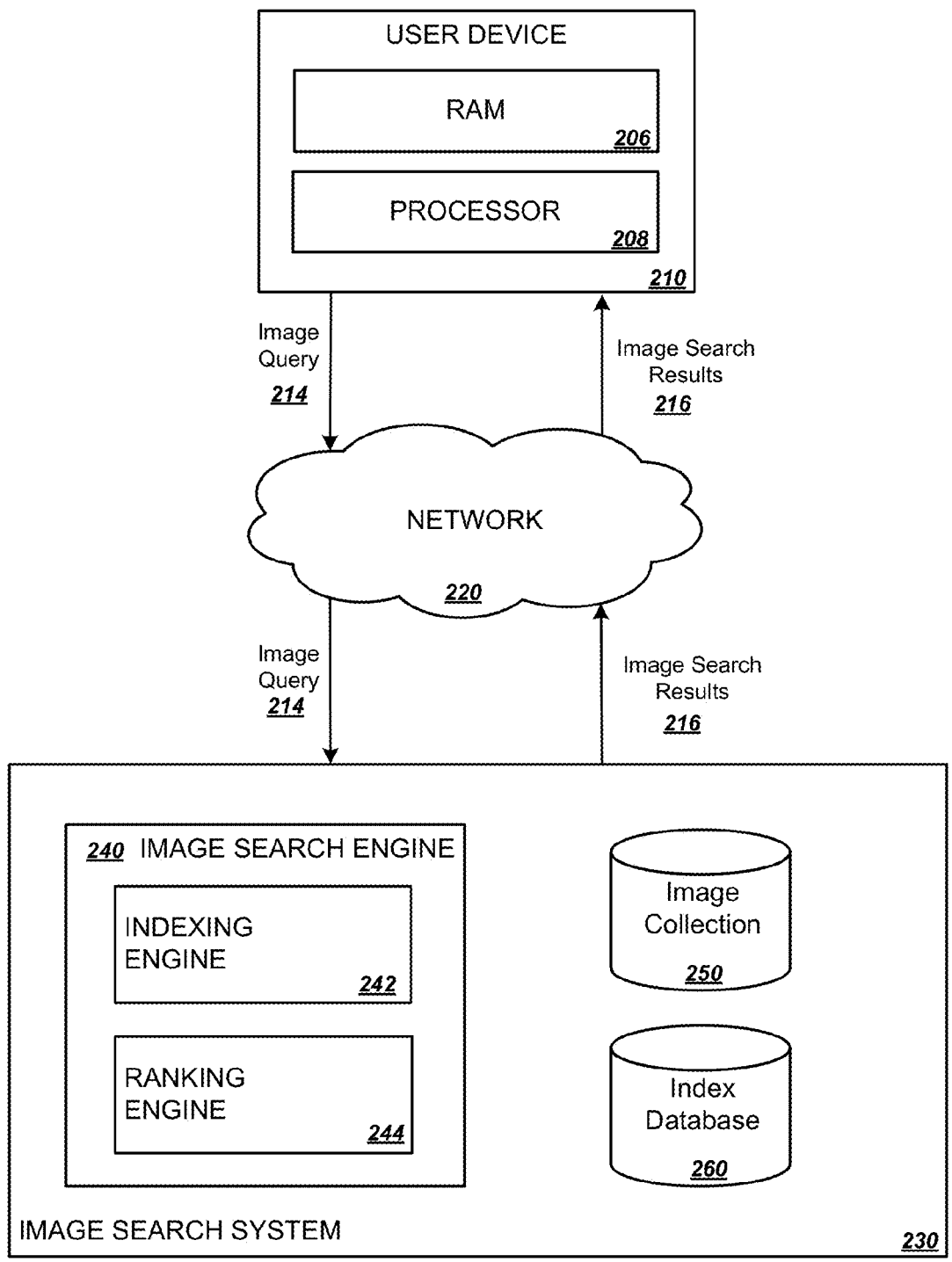
FIG. 2 illustrates an example image search system.

FIG. 2 illustrates an example image search system 230. The image search system 230 is an example of an information retrieval system in which the systems, components, and techniques described below can be implemented.

A user device 210 can be coupled to the image search system 230 through a data communication network 220. In operation, the user device 210 requests image search results 216 by transmitting an image query 214 over the network 220 to the image search system 230. The image query 214 can specify text, a particular query image, or both. For example, the image query can specify a query image by an image file or by a resource locator, e.g., a uniform resource locators (URL), provided by the user device 210. The image search system 230 identifies images that satisfy the image query 214 and generates image search results 216. The image search system 230 transmits the image search results 216 over the network 220 back to the user device 210 for presentation to a user. Generally, the user is a person; but in certain cases, the user can be a software agent.

The user device 210 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors, e.g., processor 208, for executing program instructions, and random access memory, e.g., RAM 206. The user device 210 can include computer readable media that store software applications, e.g., a browser or layout engine, an input device, e.g., a keyboard or mouse, a communication interface, and a display device.

The network 220 can be, for example, a wireless cellular network, a wireless local area network (WLAN) or Wi-Fi network, a Third Generation (3G), Fourth Generation (4G), or other mobile telecommunications network, a wired Ethernet network, a private network such as an intranet, a public network such as the Internet, or any appropriate combination of such networks.

The image search system 230 can be implemented as computer programs installed on one or more computers in one or more locations that are coupled to each other through a network, e.g., network 220. The image search system 230 includes a search engine 240, an image collection 250 and an index database 260. The index database 260 contains one or more indices of images in the image collection 250. The "indexed images" can be images in the image collection 250 that are indexed by any of the indices in the image database 250. The indexed images can also be images that are accessible over a network, e.g. the Internet.

The search engine 240 will generally include an indexing engine 242 that indexes images. The search engine 240 can assign visual words to images; in this context, images may be said to have visual words, and one may refer to the visual words of an image. In some implementations, the indexing engine maintains multiple posting lists in the index database 260. Each posting list is a list of images in the image collection 250 that have a same particular visual word.

When the image query 214 is received by the image search system 230, the search engine 240 identifies resources that satisfy the image query 214. If the image query 214 specifies text, the image search system 230 identifies relevant images using text associated with the images. If the image query 214 specifies an image, the image search system 230 identifies indexed images in the index database 260 that the system determines to be most similar to or match a query image specified by the image query 214.

The search engine 240 includes a ranking engine 244 that can rank identified images. The ranking engine 244 ranks the matching images by a number of criteria, e.g. by a measure of relevance to text in the image query 214, by a measure of similarity to a query image specified by the image query 214, or by a quality of an image referrer. In some implementations, the ranking engine 214 determines that an image matches the query image when the two images have at least a threshold number of visual words in common.

The image search system 230 can respond to the image query 214 by generating image search results 216 from the ranked set of matching images, which the system can transmit over the network 220 to the user device 210 in a form that can be presented on the user device 210, e.g., in a form that can be displayed in a web browser on the user device 210. For example, the image search results 216 can be presented in a markup language document, e.g., a HyperText Markup Language or eXtensible Markup Language or Wireless Markup Language document. The user device 210 renders the received form of the image search results 216, e.g., by a web browser rendering a markup language document, in order to present the image search results 216 on a display device coupled to the user device 210.

Multiple image search results 216 are generally presented at the same time; although on a small display device the results may be presented one at a time. Each of the presented image search results can include titles, text snippets, images, links, or other information. Each image search result is linked to a particular resource where the image can be found, e.g., an Internet-addressable document. Selection of an image search result can cause a display program running on the user device 210 to request the resource associated with the image search result.

The image search system 230 can suppress near-duplicate images from appearing in a same set of image search results. For example, the image search system 230 can preprocess images in image collection 250 to identify sets of two or more images that are near-duplicates of each other. When an image in a set of near-duplicate images satisfies the image query 214, the image search system 230 can select one image from the set of near-duplicate images for responding to the image query 214.

The image search system 230 can also prevent images that are near-duplicates of a query image specified by image query 214 from appearing in a set of image search results. In other words, the image search system 230 can evaluate a query image specified by the image query 214, determine that one or more image search results specify near-duplicates of the query image, and remove those near-duplicate images from a set of image search results. In some implementations, a user of the image search system 230 can control near-duplicates of the query image from appearing in image search results.

The image search system 230 can determine that two images are near-duplicate images by computing and comparing descriptors for the images. In this specification, the term "descriptor" refers to a data structure storing information about the content of an image. For example, a descriptor can be a vector of integer or floating point numbers. An image search system can compute a feature descriptor from the features of an image's content. An image search system can compute a color descriptor from color information in the image. An image search system can compute a general content descriptor using an image's features and an image's color information. For example, an image search system can combine one or more elements of an image's feature descriptor and color descriptor into a content descriptor.

By comparing respective descriptors computed from two images, an image search system can determine whether or not the two images are near-duplicate images. An image search system may be able to determine whether or not two images are near-duplicate images by comparing only their respective feature descriptors, only their respective color descriptors, or by comparing both.

Figure 3:
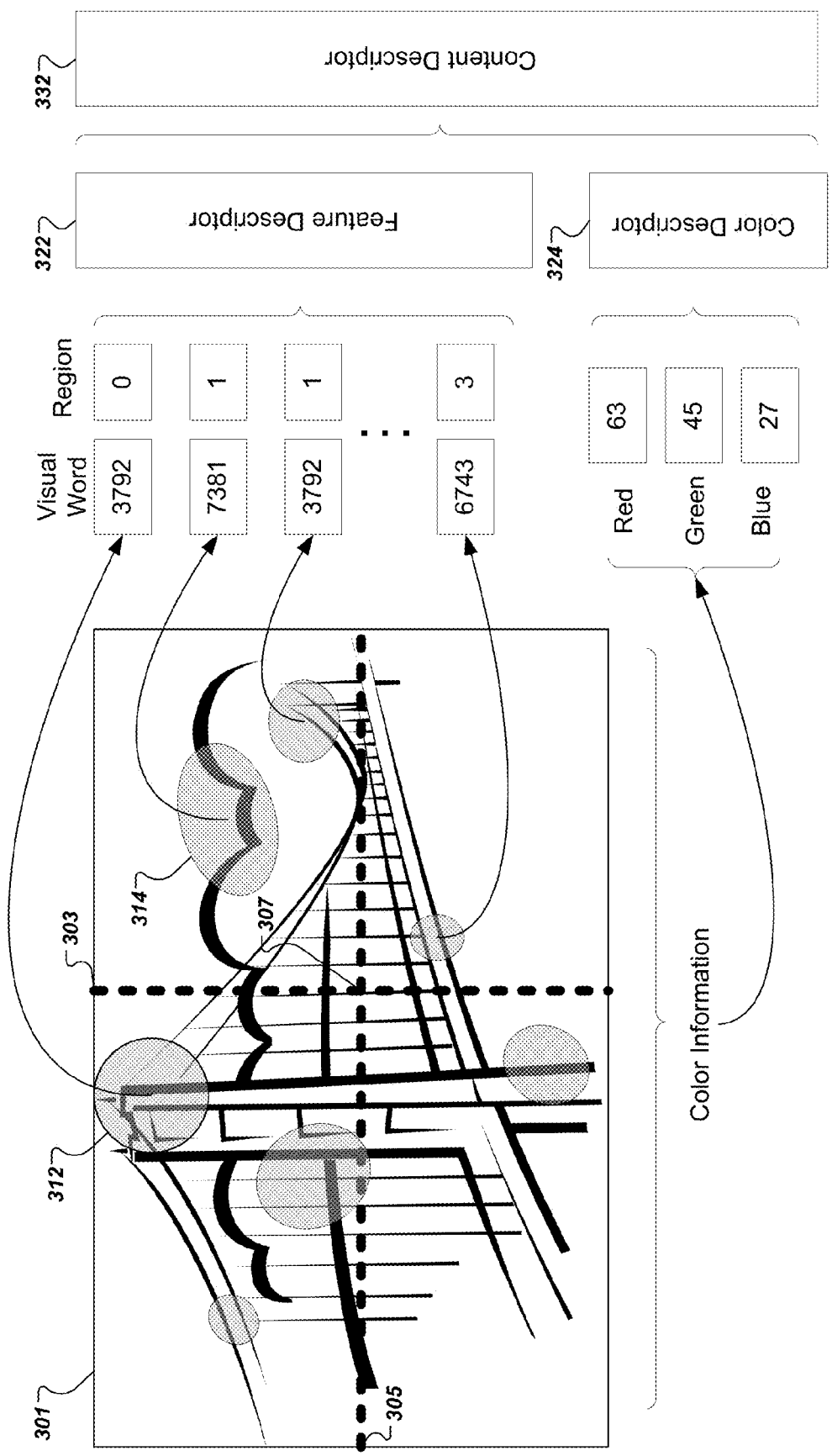
FIG. 3 is a diagram illustrating computing a feature descriptor and a color descriptor of an image.

FIG. 3 is a diagram illustrating computing a feature descriptor 322 and a color descriptor 324 of an image 301. In general, an image search system can compute a feature descriptor 322 for an image from visual words computed from an image. The image search system can compute a color descriptor 324 for an image from color information in the image.

An image search system can compute visual words of an image from local features of an image. An image search system can extract "local features" from an image by computing feature vectors from a particular subset of an image, or a feature region. For example, the image search system can select elliptical regions 312 and 314 in the image 301 as feature regions. The regions may also be shapes other than ellipses. The system 110 can identify feature regions in each of a plurality of images in a collection of images. Determining feature regions can be performed using a variety of conventional techniques, for example, as described in J. Matas, O. Chum, M. Urban, and T. Pajdla, *Robust Wide Baseline Stereo from Maximally Stable Extremal Regions*, Image and Vision Computing, vol. 22, no. 10, pp. 761-767, (2004), or as described in Lowe, David G., *Object Recognition from Local Scale-Invariant Features*, Proceedings of the International Conference on Computer Vision, Vol. 2, pp. 1150-1157 (1999).

The image search system can compute a feature vector from the image content of each feature region. A feature vector is a vector in which each element of the vector is a quantity that represents a feature value of a feature of the corresponding feature region. Each feature region has a location in the image, e.g., x-y coordinates in the image, and a scale that represents the size of the feature region.

The image search system can organize the feature space of feature vectors into a finite number of cells, which can be referred to as "visual words." Then, for a given feature vector, the image search system can quantize the feature vector into a visual word by determining to which of the visual word cells the feature vector should be assigned. The image search system can determine to which of the cells of the feature space a particular feature vector should be assigned by computing a distance between the feature vector and each cell and by assigning the feature vector to the closest cell. The system can use any appropriate distance metric in the feature space, e.g., the L2 distance. The system can compute distance to a cell with reference to a particular point in the cell, for example, a computed cell center or a selected feature vector that belongs to the cell. Thus, for each selected feature region, the image search system determines at least one visual word. Each visual word can be associated with a location in the image and a scale, which can be borrowed or derived from the location and scale of the corresponding feature region.

The image search system can generate a vocabulary of visual words by operating on a training set of images. The image search system can compute feature vectors of feature regions in the training images and organize the feature vectors into cells using clustering. For example, the image search system can cluster the feature vectors of the training images into a fixed number of clusters, e.g., 10, 10,000, or 10 million clusters. For example, an image search system can define a vocabulary of 10,000 visual words by clustering feature vectors computed from a set of training images into 10,000 clusters.

The system can initially cluster the feature vectors of the training images into a first, relatively small, number of clusters, and then iteratively determine local subclusters of each cluster until a target number of clusters is reached. The system can use any appropriate clustering algorithm, e.g., k-means, to determine the clusters and can use any appropriate distance metric, e.g., the L2 or Chevbyshev distance, when assigning a feature vector to a nearest cluster.

The system can initialize the clustering process by randomly or pseudorandomly selecting a relatively small number of feature vectors, e.g., 200, from a larger set of feature vectors to be candidate cluster centers. The system can then assign all feature vectors of all training images to a nearest candidate cluster center. At each iteration, the system can increase the number of clusters by performing a clustering algorithm locally only on feature vectors assigned to a cluster. In other words, a particular cluster can be further locally clustered into a number of subclusters, e.g., four subclusters. The system can maintain a more uniform distribution of training samples in each feature cell by assigning substantially the same number of training samples to each cluster on each iteration.

Some feature cells will have a higher density of feature vectors than others. An image search system can compute the density of a feature cell by computing a size of the cluster and dividing by the number of feature vectors that belong to the cluster. The system can compute a size of each cluster by measuring an average distance between a cluster center and feature vectors assigned to the cluster. The system can first calculate a center point of each cluster and then compute a distance between the computed center and each training example assigned to the cell. The distance can be measured by any appropriate metric between vectors, e.g., the L2 distance. The computed distances within each cluster can be used to compute a size of the cluster. For example, the size can be computed as an arithmetic or geometric mean of the computed distances from feature vectors in a cluster to the cluster center.

The system can assign an index number to each defined feature cell to encode feature cell assignments to visual words. For example, the system can assign index numbers to the feature cells, e.g., numbers from 0 to N−1, where N is the number of feature cells. For example, in FIG. 3, a feature vector computed from feature region 312 quantizes to visual word index number 3792. In other words, the feature vector for feature region 312 was closest in the feature space defined by feature vectors of the training images to the center of a feature cell with index number 3792. Similarly, a feature vector from feature region 314 quantizes to visual word index number 7381.

An image search system can also encode the locations associated with the visual words of an image. The image search system can partition an image into a number of partitions and can assign index numbers to the partitions, e.g., numbers from 0 to M−1, where M is the number of partitions.

The image search system can partition an image using tiles, which partition an image using a grid. For example, in FIG. 3, image 301 has been divided into four tiles by intersecting lines 303 and 305, which are shown for illustrative purposes only and which do not actually appear in image 301. The top-left tile has been assigned an index number of 0.

The image search system can quantize the location of visual words to the index number of an image tile from which the visual word is derived. For example, feature region 312 quantizes to image tile index number 0 because feature region 312 is located in image tile 0. Therefore, the image search system can encode image features of feature region 312 as visual word 3792 and image tile 0. Similarly, the image search system can encode image features of feature region 314 as visual word 7381 and image tile 1.

The image search system can partition an image into a plurality of image tiles in a variety of ways. The system can for example partition an image as a grid defined by one or more image partition points. For example, the image search system can choose the midpoint of an image as a single point that partitions the image into four tiles of substantially equal size. Image 301 has been partitioned by image partition point 307, which defines the partitioning lines 303 and 305.

The image search system can also define different image partition points for each visual word in the vocabulary of visual words. For example, visual word number 3792 can have different image partition points than visual word number 7381. In some implementations, the image search system can define an image partition point for a particular visual word by computing an offset from an image's midpoint. The offset can be a pair of x-y coordinates that define a position, e.g., (−5, 10), relative to a point in an image, e.g., relative to an image's midpoint. The offset coordinates can indicate any appropriate unit, e.g. pixels or centimeters. The offset can also be stored as a pair of x-y coordinates that define an absolute image position, e.g., (250, 100).

The offsets for a visual word can be computed as a function of the visual word's index number. For example, the system can use the visual word index number as input to a random or pseudorandom number generator to define the x-y coordinates of the offsets. The offsets can be constrained to a particular range. For example, the offsets can be constrained to a value between 0 pixels and 50 pixels. Other offset constraints can also be used.

The image search system can generate and store the offsets for the visual words before computing descriptors for images. Thus, the offsets need not be stored as part of an image's feature descriptor or color descriptor. When determining an image tile encoding for a particular visual word, the image search system can partition the image into multiple tiles using the one or more stored offsets for the particular visual word.

The image search system can use the encoded visual words and corresponding image tiles to generate a feature descriptor 322. The feature descriptor 322 can be, for example, a collection of visual word and associated image tile encodings. The feature descriptor may resemble a vector, although the elements of the descriptor can occur in any order. The system may nevertheless sort the elements of a descriptor to improve efficiency of comparison with other feature descriptors.

Each elements of a feature descriptor includes an encoded visual word and an encoded image tile associated with the visual word. Elements from different feature descriptors are said to "match" if both the visual word encoding and the image tile encoding are the same. Elements from different feature descriptors can match regardless of where the elements occur in the feature descriptor.

The system can allocate a specific number of bits in the feature descriptor to encode the visual words and associated image tiles. The image search system can use feature descriptors of two images to determine whether or not the images are near-duplicates, which will be described in further detail below.

The image search system can also encode color information in the image 301 to generate a color descriptor 324. In some implementations, the system computes a representative color value for each color channel in the image. For example, the system can compute a mean red value, e.g., an arithmetic or geometric mean, of pixels in image 301. The system can encode or quantize the representative color value when generating the color descriptor 324. For example, image 301 has a quantized mean red value of 63. In this example, the color descriptor 324 is generated by concatenating quantized mean values for red, green, and blue color channels in image 301. Other representative color values can also be used.

Each element of a color descriptor is an encoded representative color value. Thus, the color descriptor can be an ordered vector, in which the order of elements matters for comparison with other color descriptors.

In some implementations, the image search system only encodes color information in a portion of the image, for example, colors in the center of the image. For example, to compute the representative color values, the system can crop off a percentage of the image, e.g., 10% or 15% on all sides, and compute representative color values from the cropped image. In some other implementations, the image search system can compute representative color values by giving greater weight to pixels that are closer to the center of the image.

The image search system can use the encoded color information in color descriptor 324 to determine whether or not two images are near-duplicates, as will be described in further detail below.

The system can concatenate a feature descriptor and a color descriptor into an overall content descriptor 332. The content descriptor will be small to provide for fast retrieval and comparison. The system can control the size of the content descriptor 332 by selecting a predetermined number of feature regions from which to generate feature descriptor 322. For example, the system can select 5, 10, or 100 feature regions to generate feature descriptor 322.

Because the image search system may identify more feature regions than the number required to generate the content descriptor 332, the image search system can select a subset of identified feature regions according to a variety of criteria.

For example, the image search system can select feature regions based on scale. The image search system can select larger feature regions over smaller feature regions. Larger feature regions tend to contain more information than smaller feature regions, so the image search system can prefer larger feature regions while selecting feature regions.

The image search system can also select feature regions based on a measure of strength or robustness of the feature region. The image search system can compute a measure of strength for each feature region and can choose feature regions with high strength measures. In general, high contrast areas in images will have high strength measures, so the image search system can prefer high contrast feature regions having high strength measures while selecting feature regions.

The image search system can also select feature regions based on a density of corresponding visual words and can prefer feature regions that quantize to low-density visual words. As described above, the clusters of a visual word vocabulary can have differing densities. Low-density visual words tend to be more discriminating than high-density visual words, so the image search system can prefer feature regions that quantize to low-density visual words while selecting feature regions.

The image search system can combine a variety of these selection criteria, e.g., by computing a weighted score, to select a subset of identified feature regions to generate feature descriptor 322.

The system can also control the size of the content descriptor 332 by adjusting the number of image tiles used to partition images. For example, by choosing only four image tiles, the system can encode the image tile associated with each visual word using only two bits.

The system can also control the size of the content descriptor 332 by adjusting the size of the visual word vocabulary. For example, by choosing a vocabulary of 1024 words, the system can encode the index number of each visual word using only 10 bits.

In some cases, the system may not be able to identify a desired number of feature regions in an image. This can happen, for example, in images that have large spaces or solid colors, e.g., an image of a flag. In such cases, the system can alternatively determine that two images are near-duplicates by computing and comparing "whole image" content descriptors, rather than content descriptors based on local features. The whole-image content descriptor can be a feature vector that includes histogram values of image color or gray scale data, e.g., the number of red pixels in an image; image locations of edges, corners, textures, centers of gravity, or other interest points; and other geometric information. The system can then compare two whole-image content descriptors using an appropriate distance metric, e.g., the L1 distance.

Figure 4:
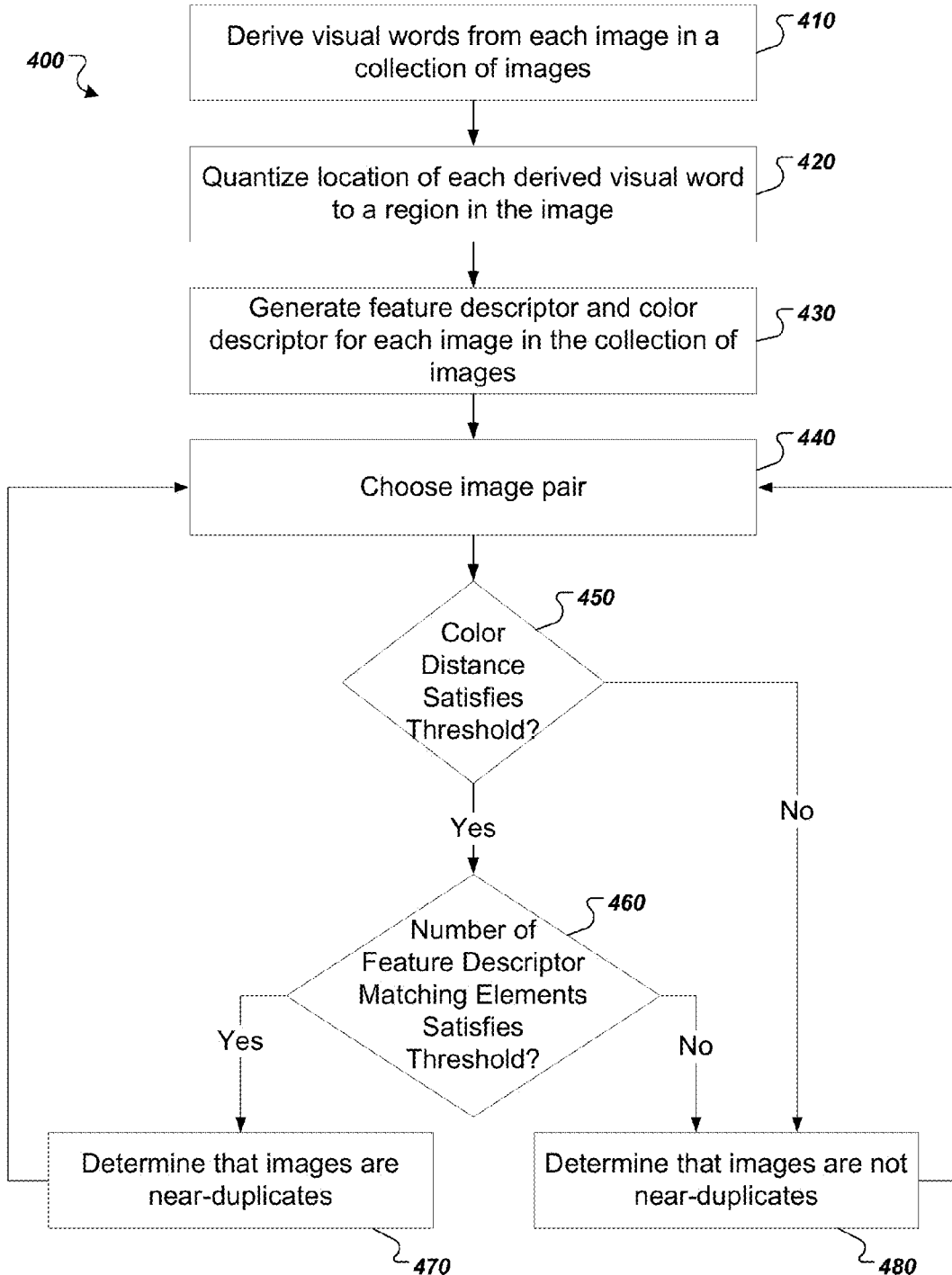
FIG. 4 is a flow chart of an example process for determining that images are near-duplicate images.

FIG. 4 is a flow chart of an example process 400 for determining that images are near-duplicate images. The process 400 compares feature descriptors and color descriptors computed for images. The process 400 can be performed by a search engine while indexing images or at query time when generating image search results for an image query. For convenience, the process 400 will be described as being performed by an appropriately programmed system of one or more computers.

The system derives visual words from each image in a collection of images (410). For example, the system can identify and select a number of feature regions in an image as described above. The feature regions used for identifying near-duplicates may, but need not, be the same feature regions that an image search system uses to compute visual words used for indexing and retrieval.

The system quantizes the location of each derived visual word to a region in the image (420). The system can divide an image into multiple regions and can use a different division for each visual word in a vocabulary of visual words, as described above.

The system generates a feature descriptor and a color descriptor for each image in the collection of images (430). The system can generate a feature descriptor by encoding the visual words and associated image tiles. The system can generate a color descriptor by encoding color information from the image.

The system chooses an image pair (440). In general, the system compares the descriptors of two images to determine whether or not the two images are near-duplicates. In some implementations, the system can choose an initial image and compare the descriptors of the initial image with respective descriptors of each other image in the collection of images. The system can repeatedly perform this process for all images in a collection of images to identify collections of near-duplicate images in the collection of images.

In some implementations, the system obtains image search results that match text or a query image and retrieves stored descriptors of images identified by the image search results. The system can compare descriptors of a query image to respective descriptors of each image identified by the image search results. The system can, for example, remove one or more near-duplicates of a query image from the set of image search results.

The system can also compare descriptors of each image in the image search results to descriptors of all other images in the image search results and remove near-duplicates of images that are retained in the image search results. For example, the system can identify near-duplicates to ensure that only one image in a set of near-duplicate images occurs in a set of image search results.

In some implementations, the system obtains a set of image search results and then uses a clustering algorithm to identify sets of near-duplicate images within the image search results, for example using k-means or sequential leader clustering. Then, for each set of near-duplicate images, the system can choose a single image to provide as part of the image search results.

The system determines whether the color distance between color descriptors satisfies a threshold (450), e.g., whether the color distance is within a threshold distance. The system can compute a representative color value for each of one or more color channels of each image and compare the corresponding representative color values. For example, the system can compute a representative red color value as the mean red channel value for pixels in each image.

The system can compute a color distance between images using an appropriate distance measure, for example, the L1 distance. In other words, the system can compute a sum of absolute values of differences between corresponding representative color values for each of the one or more color channels of the images.

If the color distance does not satisfy the threshold, the system can determine that the images are not near-duplicate images (branch to 480).

If the color distance satisfies the threshold, the system can apply additional tests to determine whether or not the images are near-duplicate images (branch to 460).

The system determines whether the number of matching feature descriptor elements satisfies a threshold (460). Each feature descriptor element encodes a visual word from the vocabulary of visual words and an associated image tile from where the visual word was derived. To be considered a match, both the visual word and image tile from corresponding feature descriptors must be the same. The system can thus concatenate the visual word and image tile encodings when generating an element of a feature descriptor and can directly compare the concatenated feature descriptor elements. In other words, the system need not compare the visual word and image tile encodings separately.

If the number of matching feature descriptor elements does not satisfy the threshold, the system determines that the images are not near-duplicates (branch to 480).

If the number of matching feature descriptor elements satisfies the threshold, the system determines that the images are near-duplicates (branch to 470).

Although the process 400 is illustrated as comparing the color descriptors before the feature descriptors, the tests can be applied in any order or in parallel. For example, in some implementations, if the color distance satisfies the threshold, the system determines that the images are near-duplicates without applying additional tests.

The results of one test may also influence a subsequent test. For example, the system can alter the color distance threshold based on the number of matching feature descriptor elements. In some implementations, the system can lower the color distance threshold if a higher number of feature descriptor elements are matching between the images. This can occur, for example, if one image is a duplicate of another image, but with only changed color information. For example, the system can require a first color distance threshold T if at least three feature descriptor elements match between two images. But the system can require a lower color distance threshold, e.g. T/4, if ten or more feature descriptor elements match between the two images.

The system can also alter the thresholds based on other factors. For example, the system can increase the matching element threshold based on the image type of an image. In some implementations, the system increases the matching element threshold for line drawings. For example, the system can require a default matching element threshold, e.g. 5 matches, for regular images. But if the images are line drawings, the system can require a higher matching element threshold, e.g. 10 matches. The system can determine that two images are line drawings, for example, by using a trained line drawing classifier.

The system can also apply additional tests other than those illustrated by the process 400. For example, the system can additionally require a particular number of matches from image tiles before determining that the images are near-duplicates. In other words, if all matching feature descriptor elements are from a single image tile, the system can determine that the images are not near-duplicates. In some implementations, the system requires there to be matching feature descriptor elements from at least 50% of the image tiles.

After determining whether or not the chosen pair of images are near-duplicates, the system can choose another image pair of images for evaluation (branch to 440).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

The term "engine" refers to one or more software modules implemented on one or more computers in one or more locations that collectively provide certain well defined functionality, which is implemented by algorithms implemented in the modules. The software of an engine can be an encoded in one or more blocks of functionality, such as a library, a platform, a software development kit, or an object. An engine can be implemented on any appropriate types of computing devices, e.g., servers, mobile phones, tablet computers, notebook computers, music players, e-book readers, laptop or desktop computers, PDAs, smart phones, or other stationary or portable devices, that includes one or more processors and computer readable media. Additionally, two or more engines may be implemented on the same computing device or devices.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
generating a plurality of feature vectors for each image in a collection of images, wherein each feature vector is associated with an image tile of an image, wherein each feature vector corresponds to one of a plurality of predetermined visual words and wherein generating a feature vector for a particular image in the collection of images comprises:
determining a feature region in the particular image;
computing the feature vector from the feature region in the particular image;
quantizing the feature vector to one of the plurality of visual words;
determining an image tile to which the feature region is located;
associating the visual word with the image tile for the feature region; and
classifying as near-duplicate images all images in the collection of images that share at least a threshold number of matching visual words associated with matching image tiles.

2. The method of claim 1, further comprising:
determining a different image tiling for each visual word in the plurality of predetermined visual words, wherein an image tiling partitions an image into a plurality of distinct tiles.

3. The method of claim 2, wherein determining a different image tiling for each visual word in the plurality of predetermined visual words comprises computing an offset based on an index number of the visual word.

4. The method of claim 1, further comprising generating a feature descriptor for each image including encoding each element of the feature descriptor using each visual word and associated image tile of the image.

5. The method of claim 1, further comprising:
determining an image type for each image in the collection of images; and
determining the threshold number of matching visual words between images based on the image type of the images.

6. The method of claim 1, further comprising:
receiving an image query;
obtaining the collection of images as image search results for the image query; and
removing one or more near-duplicate images from the collection of images as image search results for the image query.

7. A computer-implemented method comprising:
receiving a query image;
obtaining a set of image search results for the query image;
generating a plurality of feature vectors for the query image, wherein each feature vector is associated with an image tile of the query image, wherein each feature vector corresponds to one of a plurality of predetermined visual words;
generating a plurality of feature vectors for each image identified by the image search results, wherein each feature vector is associated with an image tile of an image, and wherein generating a feature vector for a particular image identified by the image search results comprises:
determining a feature region in the particular image;
computing the feature vector from the feature region in the particular image;
quantizing the feature vector to one of the plurality of visual words;

determining an image tile to which the feature region is located; and associating the visual word with the image tile for the feature region;

determining that one or more images in the image search results that share at least a threshold number of matching visual words associated with matching image tiles with the query image are near-duplicate images of the query image; and removing one or more near-duplicate images of the query image from the set of image search results.

8. The method of claim 7, further comprising:

determining a different image tiling for each visual word in the plurality of predetermined visual words, wherein an image tiling partitions an image into a plurality of distinct tiles.

9. The method of claim 8, wherein determining a different image tiling for each visual word in the plurality of predetermined visual words comprises computing an offset based on an index number of the visual word.

10. A system comprising:

one or more computers and one or more storage devices storing instructions that are operable, when executed by the one or more computers, to cause the one or more computers to perform operations comprising:

generating a plurality of feature vectors for each image in a collection of images, wherein each feature vector is associated with an image tile of an image, wherein each feature vector corresponds to one of a plurality of predetermined visual words, and wherein generating feature vector for a particular image in the collection of images comprises:

determining a feature region in the particular image;

computing the feature vector from the feature region in the particular image;

quantizing the feature vector to one of the plurality of visual words;

determining an image tile to which the feature region is located; and associating the visual word with the image tile for the feature region; and classifying as near-duplicate images all images in the collection of images that share at least a threshold number of matching visual words associated with matching image tiles.

11. The system of claim 10, wherein the operations further comprise:

determining a different image tiling for each visual word in the plurality of predetermined visual words, wherein an image tiling partitions an image into a plurality of distinct tiles.

12. The system of claim 11, wherein determining a different image tiling for each visual word in the plurality of predetermined visual words comprises computing an offset based on an index number of the visual word.

13. The system of claim 10, wherein the operations further comprise generating a feature descriptor for each image including encoding each element of the feature descriptor using each visual word and associated image tile of the image.

14. The system of claim 10, wherein the operations further comprise:

determining an image type for each image in the collection of images; and determining the threshold number of matching visual words between images based on the image type of the images.

15. The system of claim 10, wherein the operations further comprise:

receiving an image query;

obtaining the collection of images as image search results for the image query; and removing one or more near-duplicate images from the collection of images as image search results for the image query.

16. A system comprising:

one or more computers and one or more storage devices storing instructions that are operable, when executed by the one or more computers, to cause the one or more computers to perform operations comprising:

receiving a query image;

obtaining a set of image search results for the query image;

generating a plurality of feature vectors for the query image, wherein each feature vector is associated with an image tile of the query image, wherein each feature vector corresponds to one of a plurality of predetermined visual words;

generating a plurality of feature vectors for each image identified by the image search results, wherein each feature vector is associated with an image tile of an image, and wherein generating a feature vector for a particular image identified by the image search results comprises:

determining a feature region in the particular image;

computing the feature vector from the feature region in the particular image;

quantizing the feature vector to one of the plurality of visual words;

determining an image tile to which the feature region is located; and associating the visual word with the image tile for the feature region;

determining that one or more images in the image search results that share at least a threshold number of matching visual words associated with matching image tiles with the query image are near-duplicate images of the query image; and removing one or more near-duplicate images of the query image from the set of image search results.

17. The system of claim 16, wherein the operations further comprise:

determining a different image tiling for each visual word in the plurality of predetermined visual words, wherein an image tiling partitions an image into a plurality of distinct tiles.

18. The system of claim 17, wherein determining a different image tiling for each visual word in the plurality of predetermined visual words comprises computing an offset based on an index number of the visual word.

* * * * *